Sept. 30, 1958 C. E. ANDERSON 2,854,000
TRACTION LEGGING
Filed Oct. 12, 1955 2 Sheets-Sheet 1

Carl E. Anderson INVENTOR

BY *Lumen N Beaman*

ATTORNEY

Sept. 30, 1958 C. E. ANDERSON 2,854,000
TRACTION LEGGING

Filed Oct. 12, 1955 2 Sheets-Sheet 2

Carl E. Anderson INVENTOR

BY *Townsend & Beaman*
ATTORNEY

United States Patent Office 2,854,000
Patented Sept. 30, 1958

2,854,000

TRACTION LEGGING

Carl E. Anderson, Santa Rosa, Calif., assignor to S. H. Camp & Company, Jackson, Mich., a corporation of Michigan Application October 12, 1955, Serial No. 540,115

4 Claims. (Cl. 128—84)

The present invention relates to traction apparatus and specifically to a traction legging for lower extremity skin traction.

Skin traction on the lower extremity is commonly used for femoral and pelvic fractures, treatment of low back strain, ruptured lumbar intervertebral discs, Legg-Perthes disease and other back and hip disorders.

It has been the practice in the past to obtain skin traction through the use of adhesive straps, foam rubber strips and the like with elastic bandage compression. However, the practice requires a moderate amount of experience and technical ability. Accordingly, there has been a need for a safe, effective skin traction device which could be applied by relatively untrained hospital personnel, ambulance drivers and patients. It is particularly desirable that the traction device be such that it can be applied by the patient where it is used intermittently in the patients home.

Any device used for skin traction must adhere securely to the skin over an area which is wide enough to withstand the longitudinal pull which will tend to displace it in an axial direction. Mole skin or canvas backed foam rubber strips held under the compressive force of an elastic bandage and covering a skin surface of 50–100 square inches or about ⅔ of the surface of the average adult calf will give enough adhesion to withstand eight to ten pound of continuous traction. It is considered that the adhesive effect of the foam rubber results from the tiny pores in the material which exert a suction cup like action against the skin. In untrained hands this type of traction is apt to be applied incorrectly making it uncomfortable or ineffective.

According to the present invention my improved traction legging comprises two foam rubber sections of unequal width each having a fabric backing. These sections are shaped to generally conform to the calf with a substantial overlap at the front of the leg with the legging applied. At the rear portion of the legging the foam rubber sections substantially abut along their vertical rear edges and they are held in their relative position by a fashioned elastic insert which is connected along its vertical edges to the fabric back of the foam rubber sections along vertical lines spaced substantially from the vertical edges of the foam rubber sections. To hold the legging in place, buckles and straps are provided at the sides with the buckles and straps being disposed, with the legging applied, upon the outer surface of the foam rubber section which is overlapped by the other section.

Thus an object of the invention is to provide an improved traction legging which may be correctly applied by the patient or other untrained person.

Another object is to provide a traction legging having a pair of separate foam rubber sections in relation to each other by a calf fashioned elastic insert, all attached to the leg by adjustment structure overlying the rubber sections.

Another object is to provide an improved leg traction device having novel compression structure for foam rubber sections.

A further object is to provide an improved leg traction device having a pair of sections of a material having a high coefficient of friction with the skin upon compression with a novel arrangement for positioning and compressing such sections upon the leg.

A still further object of the invention is to provide a unitary leg traction which may be conveniently attached to the leg and adjusted by untrained persons and which is relatively free from serious complications in use.

These and other objects and advantages residing in my improved traction legging will more fully appear from the following specification and claims.

Figure 1:
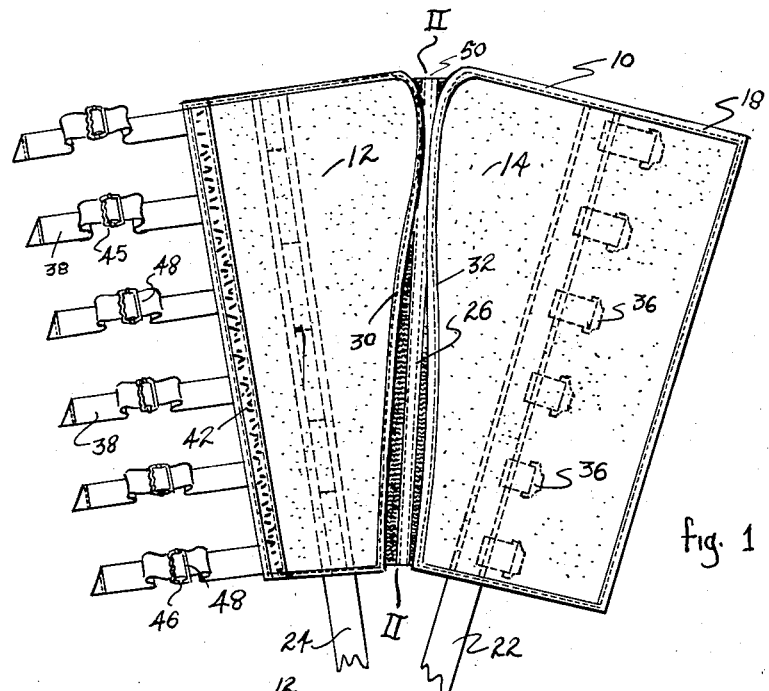
Fig. 1 is a view of the traction legging extending into a plane as seen from the inner side.
Figure 2:
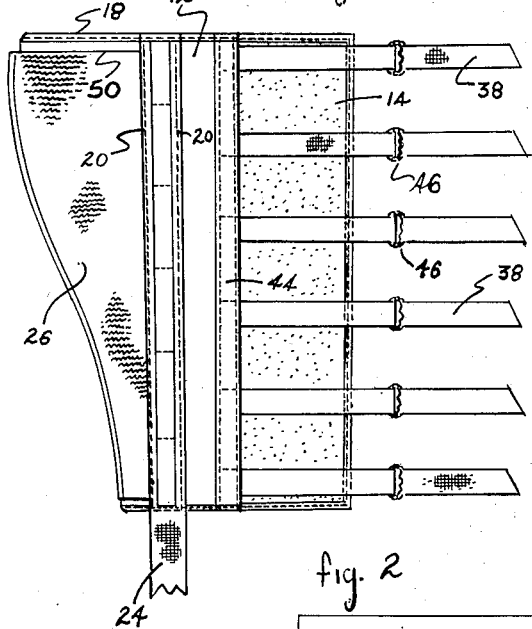
Fig. 2 is a side elevational of the traction legging folded in line II—II of Fig. 1 as seen from the outer side.
Figure 3:
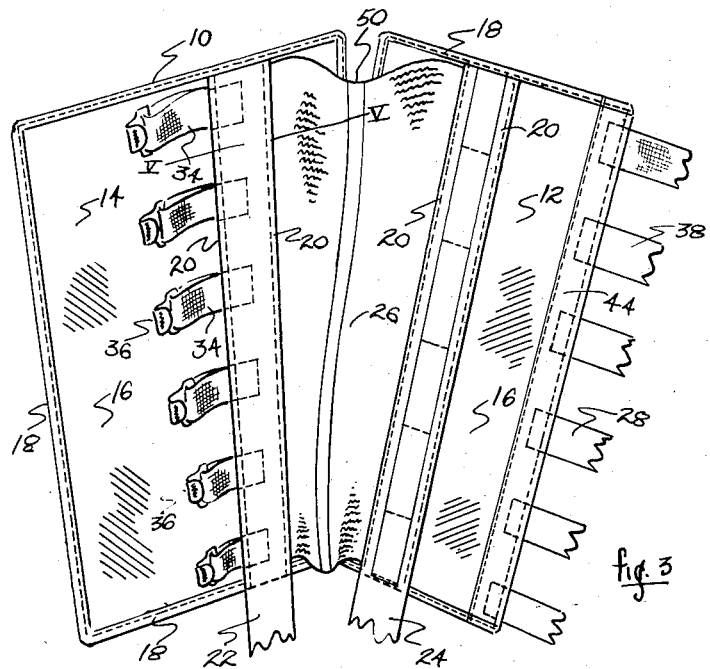
Fig. 3 is a view similar to Fig. 1 as seen from the outer side.

Referring to the illustrated form of the traction legging 10, it comprises a pair of foam rubber sections 12 and 14 of unequal width each having a fabric backing 16 and reinforced edges 18. Sewed at 20 to the backing 16 are traction straps 22 and 24 preferably of strong woven webbing to which weight is applied beyond the foot in a well known manner.

Figure 4:
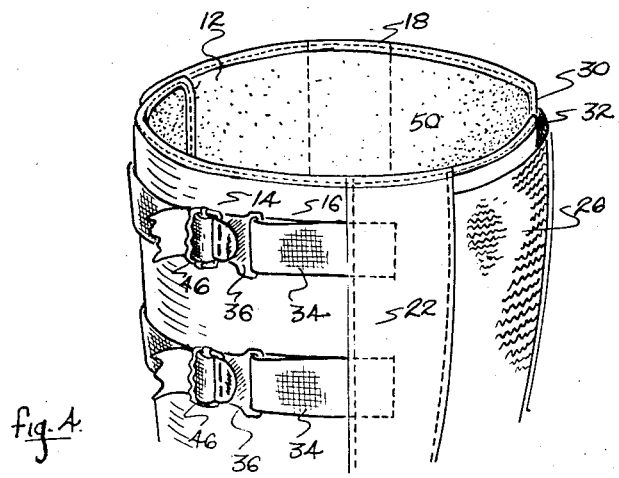
Fig. 4 is a fragmentary view of the traction legging seen as applied to the leg.
Figure 5:
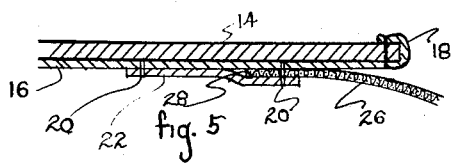
Fig. 5 is a section taken on line V—V of Fig. 3.

An insert 26 of woven elastic material is fashioned to fit the calf of the leg with the longitudinal edges 28 thereof sewn between the backing 16 and the traction straps 22 and 24 as shown in Fig. 5. The shape of the sections 12 and 14 and the insert 26 is such that the rear longitudinal edges 30 and 32 of the sections 12 and 14 are slightly spaced at the back of the leg with the legging applied (See Fig. 4) while at the front of the leg, the section 12 is underlapped by the wider section 14.

Longitudinally spaced loops 34 of woven webbing are sewn between the straps 22 and backing 16 and carry buckle attachment hooks 36. Corresponding tension adjustment straps 38 are anchored along the longitudinal edge 40 of the section 12 by being between reinforcing fabric straps 42 and 44. Adjustment buckles 46 receive the straps 38 and have a bar 48 adapted to be received upon the hooks 36.

As more clearly shown in Fig. 4, the top edge 50 of the insert 26 is disposed slightly below the top edge of the sections 12 and 14. This avoids any discomfort to the wearer. It will also be seen that the hooks 36 and buckles 46 when connected and tension is applied to compress the sections 12 and 14 upon the leg, are disposed upon the outer surface of section 14. By underlapping section 12 as shown in Fig. 4, localized pressure from the straps 38 against the leg is avoided.

It is anticipated that materials other than foam rubber may be used on the fabrication of the sections 12 and 14 in order to provide the necessary resistance to the traction to be exerted through the straps 22 and 24.

Those skilled in the art will readily appreciate that the structure overlying the foam rubber, namely backing 16, insert 26 and the adjustment structure will provide well distributed compression to the foam rubber to hold the latter in intimate contact with the skin to firmly and effectively attach the straps 22 and 24 to the leg. All tendency for the legging to slide relative to the leg toward the ankle under traction is overcome. At the same time the legging 10 may be correctly applied by the patient or other untrained person by merely locating the top of the legging at the level of the patella.

Having thus described my invention what I claim as new and desire to protect by Letters Patent is:

1. A traction legging comprising a pair of sections having inner surfaces characterized by good skin adhesion under compression, said sections each having front and rear longitudinal edges being separated from each other at the back of the legging in opposed relation, a fashioned elastic calf insert disposed on the outer surface of said sections and connected to said sections along longitudinal lines spaced inwardly from said rear longitudinal edges, longitudinally extending traction straps attached to said sections adjacent said lines, said sections being of different width, transverse tension straps attached to the first longitudinal edge of said sections of lesser width, attachment means for said tension straps on the outer surface of said sections of greater width and attached inwardly from the first longitudinal edge of said section of greater width whereby said section of greater width underlaps said section of lesser width at the front of the legging and said insert overlaps said section at the rear of the legging, said tension straps, upon connection to said attachment means and adjustment overlapping said sections at the front of the legging to compress said sections upon the legs at the front and tensioning said insert to compress said section upon the leg at the rear.

2. A traction legging comprising a pair of legging sections having inner surfaces characterized by good skin adhesion under compression, said sections each having front and rear longitudinal edges with said rear edges being separated from each other at the back of the legging in opposed relation, longitudinally extending tension straps connected to said sections, adjustment means overlying and overlapping said sections for compressing said surfaces upon the leg, said means include a calf fashioned elastic insert overlapping said separated edges and being attached to said section at points spaced from said separated edges.

3. A traction legging as defined in claim 2 wherein said inner surfaces are of material having the properties of foam rubber.

4. A traction legging as defined in claim 2 wherein said sections are of unequal width to overlap said sections at the front of the legging.

References Cited in the file of this patent

UNITED STATES PATENTS

| | | |
|---|---|---|
| 7,626 | Welch | Sept. 3, 1850 |
| 412,213 | Turner | Oct. 1, 1889 |
| 2,198,995 | Gray | Apr. 30, 1940 |
| 2,252,258 | Hayden | Aug. 12, 1941 |
| 2,604,889 | Erickson | July 29, 1952 |
| 2,696,208 | Falls | Dec. 7, 1954 |

FOREIGN PATENTS

| | | |
|---|---|---|
| 451,061 | Germany | Oct. 20, 1927 |